United States Patent [19]

Okada

[11] Patent Number: 5,383,701
[45] Date of Patent: Jan. 24, 1995

[54] WEATHERSTRIP FOR AUTOMOBILES

[75] Inventor: Masayasu Okada, Aich, Japan

[73] Assignee: Toyoda Gosei Co., Ltd., Nishikasugai, Japan

[21] Appl. No.: 130,527

[22] Filed: Oct. 1, 1993

[30] Foreign Application Priority Data

Oct. 1, 1992 [JP] Japan .................... 4-286751

[51] Int. Cl.⁶ .............................. B60J 1/08
[52] U.S. Cl. ............... 296/146.9; 296/201; 49/498.1; 49/368
[58] Field of Search ............... 296/146.9, 201, 202, 296/93; 49/498.1, 368

[56] References Cited

U.S. PATENT DOCUMENTS

| | | | |
|---|---|---|---|
| 2,908,949 | 10/1959 | Fiehse | 49/498.1 X |
| 2,935,771 | 5/1960 | Hatcher, Jr. | 49/498.1 X |
| 2,968,845 | 1/1961 | Dickinson | 49/498.1 X |
| 3,952,455 | 4/1976 | McAlarney | 49/498.1 X |
| 4,607,879 | 8/1986 | Mori et al. | |
| 5,105,580 | 4/1992 | Akachi et al. | |

FOREIGN PATENT DOCUMENTS 60-045272 3/1985 Japan .

*Primary Examiner*—Joseph Pape
*Attorney, Agent, or Firm*—Cushman, Darby & Cushman

[57] ABSTRACT

A weatherstrip is provided for an automobile adapted to be mounted on a center pillar thereof. The weatherstrip includes front and rear hollow seal portions having a mounting base and front and rear sealing walls, respectively. A partition wall is provided having an inverted V-shaped section such that its apex projects in an outer direction. The partition has opposite ends connected to the mounting base and is formed in a space of each of the hollow sealing portions. The sealing walls are supported by the apexes of the partition walls when the partition walls are depressed by a closing door glass.

6 Claims, 2 Drawing Sheets

WEATHERSTRIP FOR AUTOMOBILES

The priority application No. Hei 4-286751 filed in Japan on Oct. 1, 1992 is hereby incorporated herein by this reference.

BACKGROUND OF THE INVENTION

1. Field of the Invention

The present invention relates to a weatherstrip for automobiles and, more particularly, to a weatherstrip which is mounted on a center pillar of automobiles.

2. Description of Related Art

Weatherstrips upon which the rear and front end edge of front and rear door glasses 2A and 2B are pressed are generally mounted on a center pillar 1 of a sashless door automobile as shown in FIGS. 3 and 4.

FIG. 4 shows a conventional weatherstrip 3C of the type disclosed in U.S. Pat. No. 5,105,580. The weatherstrip 3C comprises hollow sealing portions 4A and 4B including a mounting base 31 and front and rear sealing walls 32a and 32b, respectively. Spaces 40a and 40b are defined by the mounting base 31 and the sealing walls 32a and 32b.

Although both sealing walls 32a and 32b are thin and are generally made of sponge rubber, the weatherstrip 3C is stable in shape. However, since the weatherstrip 3C provides only a low counter force against the pressing force which is exerted by the door glasses 2A and 2B moving in directions E1 and E2, it may exhibit poor sealing properties.

In order to overcome the above mentioned problems, a weatherstrip 3D having bridges 33a and 33b, which radially connect the mounting base 31 with the sealing walls 32a and 33b, formed in the hollow sealing portions 4A and 4B, respectively has been proposed in Japanese Utility Model Publication Jikkai-Sho 60-45272. U.S. Pat. No. 4,607,879 discloses a similar weatherstrip. An example of this conventional weatherstrip is shown in FIG. 5. If such bridges 33a and 33b are formed, the sealing properties would be improved while a higher force would be required for closing the door since the bridges 33a and 33b bias against the door glasses 2A and 2B moving in directions E1 and E2.

The weatherstrip 3D has a further problem in that the sealing wall 32b is moved together with the bridge 33b in an outer direction from the body if the rear door glass 2B, which is offset from a proper position due to variations of mounting position caused on assembly of the automobile, presses the sealing wall 32b at the position which is inwardly offset from the connection between the sealing wall 32b and the bridge 33b.

Weatherstrip 3D also exhibits a problem in that flow lines are formed on the outer surface of the connections between the sealing walls 32a, 32b and the bridges 33a, 33b, resulting in a poor appearance.

SUMMARY OF THE INVENTION

It is therefore an object of the present invention to provide a weatherstrip to be mounted on a center pillar of an automobile, which provides excellent sealing properties without requiring an increased door closing force and without forming the above mentioned flow lines so as to provide a good appearance.

In order to accomplish the above mentioned object of the present invention, there is provided a weatherstrip for automobile to be mounted on a center pillar thereof. The weatherstrip includes front and rear hollow seal portions having a mounting base and front and rear sealing walls, respectively. A partition wall is provided having an inverted V-shaped section such that its apex projects in an outer direction. The partition wall has opposite ends that are connected to the mounting base formed in a space of each of the hollow sealing portions. The sealing walls are supported by the apexes of the partition walls when the partition walls are depressed by a closing door glass.

When each of the sealing walls 32a and 32b is depressed by the door glasses 2A, 2B, the sealing walls 32a, 32b are received by the apexes of the partition walls 34a, 34b. This increases the counter forces of the sealing walls 32a, 32b against the door glasses 2A, 2B, resulting in an increased sealing force. Since the partition walls 34a, 34b have an inverted V-shape, they are readily deformed in response to the biasing force of the door glasses 2A, 2B. Since the sealing walls 32a, 32b are received by the partition walls 34a, 34b only at the final stage of the door closing operation, the necessary door closing force is not significantly increased. Further, since the partition walls 34a, 34b are connected to the mounting base 31, no flow line appears on the outer surface of the sealing walls 32a, 32b.

DETAILED DESCRIPTION OF THE PRESENTLY PREFERRED EXEMPLARY EMBODIMENTS

The present invention will be described with reference to the drawings.

Figure 2:
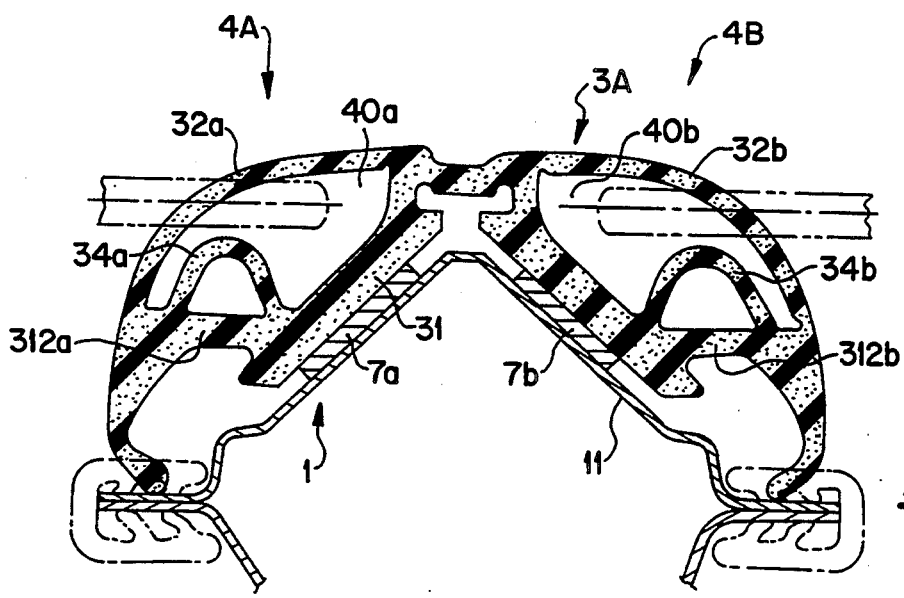
FIG. 2 is a sectional view of another embodiment of a weatherstrip of the present invention, taken along the line 1—1 in FIG. 3.

In FIG. 2, a first embodiment of the weatherstrip of the present invention is shown. A retainer 5 is fastened to an outer plate 11 of a center pillar 1, having an inverted V-shaped section, by means of screws 6. A weatherstrip 3A is adapted to the retainer 5.

Figure 1:
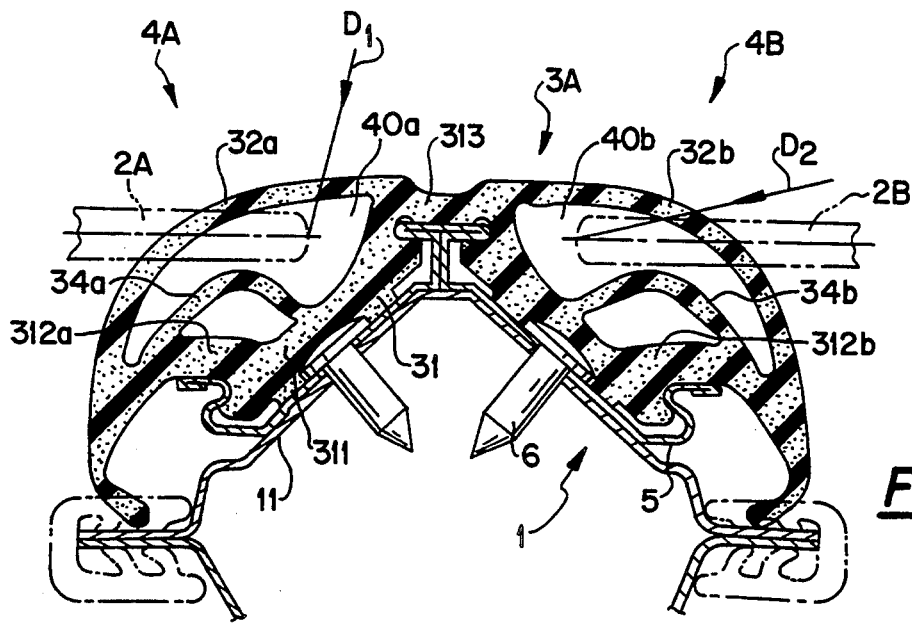
FIG. 1 is a sectional view of an embodiment of a weatherstrip of the present invention taken along the line 1—1 in FIG. 3.
Figure 3:
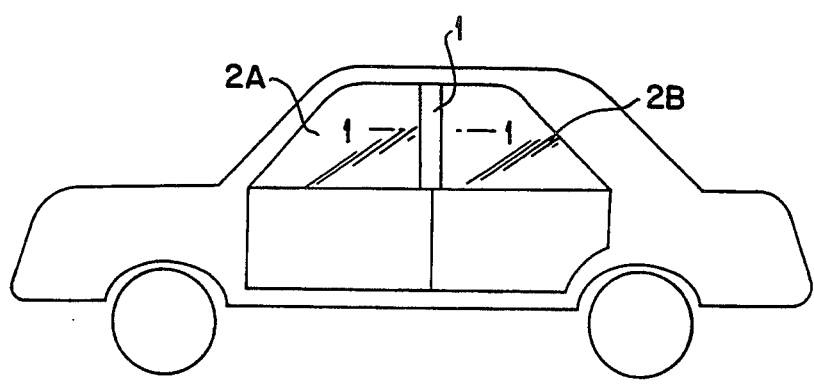
FIG. 3 is an elevational view of an automobile in which both the inventive and conventional weatherstrips are used.
Figure 4:
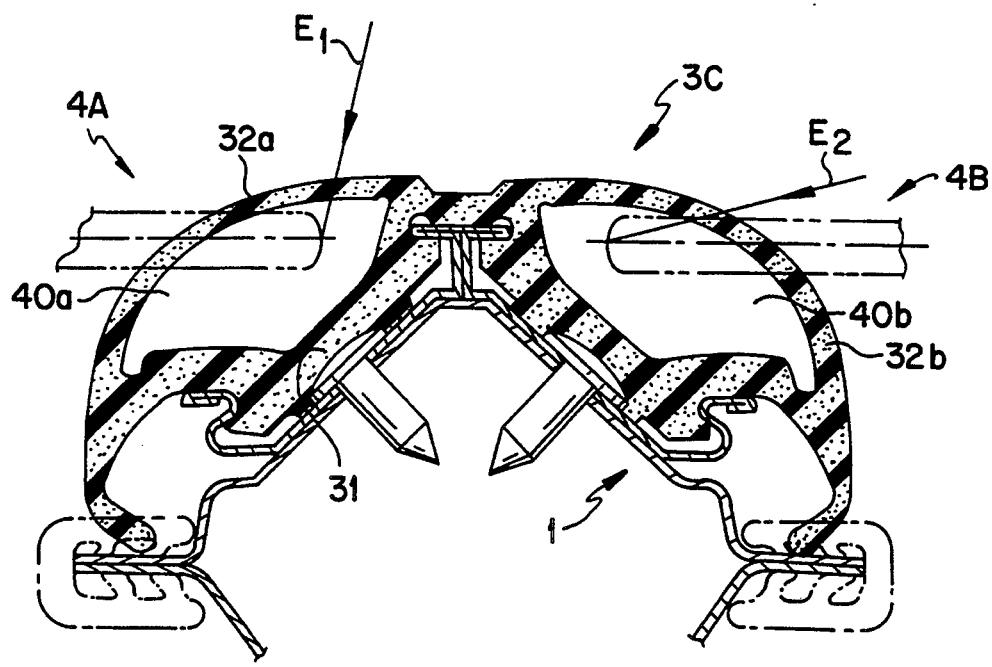
FIG. 4 is a sectional view of a conventional weatherstrip, which is taken along the line 1—1 in FIG. 3.
Figure 5:
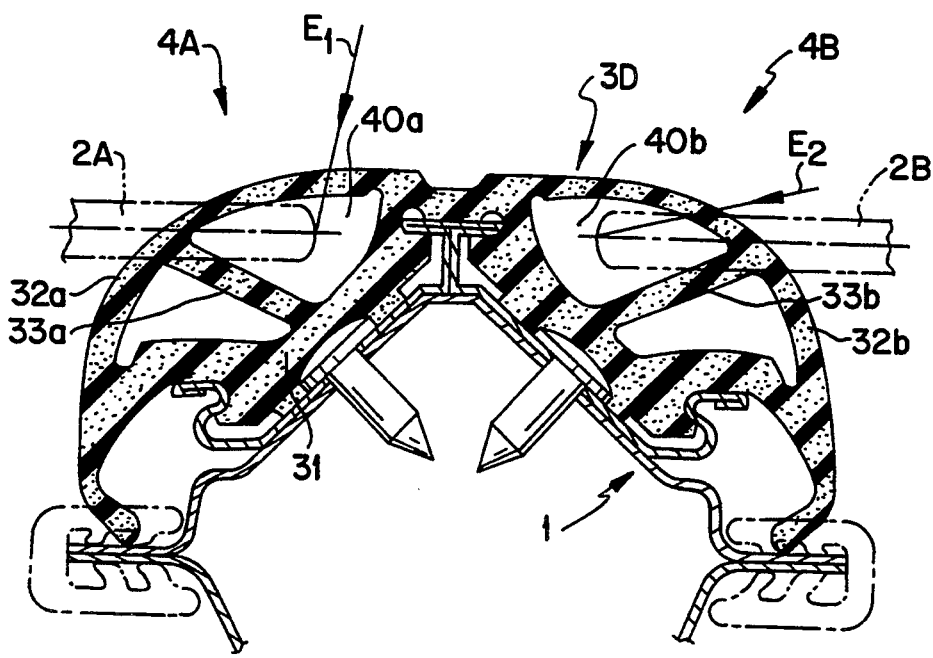
FIG. 5 is a sectional view of another prior art weatherstrip, which is taken along the line 1—1 in FIG. 3.

A mounting base 31 of the weatherstrip 3A comprises a mounting portion 311 having an inverted U-shaped section which is mounted along the center pillar outer plate 11, overhang portions 312a and 312b which overhang from the front (left side as viewed in FIG. 1) and rear (right side as viewed in FIG. 3) ends of the mounting portion 311 forwardly and rearwardly, respectively, and a projecting portion 313 which projects from the apex of the mounting portion 311 outwardly (upper side as viewed in FIG. 3). Sealing walls 32a and 32b, which are outwardly curved, are connected between the front and rear ends of the overhang portions 312a and 312b and the upper end of the projecting portion 313 to form fan-shaped hollow sealing portions 4A and 4B, respectively. Spaces 40a and 40b are defined by the mounting base 31 and the sealing walls 32a and 32b, respectively.

A partition wall 34a, having opposite ends which are integrally connected to the mounting portion 311 and the overhang 312a, is formed in the space 40a of the hollow sealing portion 4A. The partition wall 34a has an inverted V-shaped section such that the central portion or, the apex thereof, is projected outwardly from the body of the automobile.

A partition wall 34b, having opposite ends which are integrally connected to the mounting portion 311 and the overhang 312b, is formed in the space 40b of the hollow sealing portion 4B. The partition wall 34b has an inverted V-shaped section such that the central portion or the apex thereof is projected outwardly from the body of the automobile.

The weatherstrip 3A is preferably integrally made of a sponge rubber and is manufactured by the extrusion molding method.

On closing the doors of the automobile, the sealing walls 32a and 32b are depressed by the rear and front end edges of the front and rear door glasses 2A and 2B moving in the directions represented by arrows D1 and D2, respectively, and are eventually received by the apexes of the partition walls 34a and 34b, respectively. Since both door glasses 2A and 2B are received by the overlapped sealing walls, sufficient sealing is assured by the counter forces exerted by the double wall. When the sealing walls 32a and 32b are depressed by the rear and front end edges of the front and rear door glasses 32a and 32b, the end edges of the glasses are surrounded by the sealing walls 32a and 32b. At this time, the sealing walls 32a and 32b are biased upon the inner sides of the door glasses 2A and 2B at the positions slightly apart from the end edges of the glasses by the apexes of the partition walls 34a and 34b. Excellent sealing properties are obtained since each of the door glasses 2A and 2B are sealed at two positions.

In this case, the partition walls 34a and 34b are readily deformed since they have the inverted V-shaped section. Since the sealing walls 32a and 32b in the final phase of the door closing operation, the force which is necessary to close the door is not significantly increased. Even if the partition walls 34a and 34b are depressed at the sides thereof in the vicinity of the apexes due to dimensional variations in assembly of car body or in the weatherstrip 3A, the partition walls 34a and 34b are readily deformed in the depression direction and the inclination direction, and the necessary door closing force is not increased. Since the partition walls 34a and 35b are formed on the mounting base 31, the appearance of the sealing walls 32a and 32b is good.

In FIG. 2, another embodiment of the weatherstrip of the present invention is shown. The embodiment of FIG. 3 is substantially identical to that of the embodiment of FIG. 1 except for the following differences. Like parts are represented by like reference numerals. A weatherstrip 3B is adhered to the outer plate 11 of the center pillar 1 with double face adhesive coated tapes 7a and 7b instead of using the retainer (shown in FIG. 1).

The partition wall 34a, which is provided for the front space 40a, is connected to the overhang portion 312a of the mounting base 31 at both ends thereof. Similarly, the partition wall 34b, which is provided in the rear space 40b, is connected to the rear overhang 312b at both ends thereof.

The second embodiment has the same performance characteristics as the first embodiment.

Although the weatherstrips 3A and 3B of the first and second embodiments have an integral structure comprising a pair of the front and rear hollow sealing portions 4A and 4B, the present invention is also applicable to weatherstrips having separate, non-connected front and rear sealing portions.

The sealing performances of the weatherstrip of the invention mounted on the center pillar of the automobile can be improved without increasing the necessary door closing force. Further, the partition wall in the space of the hollow sealing portion will not give any adverse influence upon the appearance of the sealing wall.

What is claimed is:

1. A weatherstrip for an automobile adapted to be mounted on a center pillar thereof, the weatherstrip comprising:

a mounting base;

first and second sealing walls coupled to said mounting base so as to define first and second hollow seal portions; and a partition member disposed in each of said hollow seal portions, each said partition member having opposite ends thereof connected to said mounting base, said partition members having an inverted V-shaped section such that apexes thereof project toward said sealing walls, said apexes supporting the sealing walls when said partition members are depressed by a closing door glass of the automobile.

2. A weatherstrip as defined in claim 1, wherein said mounting base includes first and second overhang portions at opposing ends thereof, said first sealing wall being connected to said first overhang portion, said second sealing wall being connected to said second overhang portion, said opposite ends of said partition members being connected to said overhang portions.

3. A weatherstrip as claimed in claim 1, wherein said hollow sealing portions are separated by a central portion of the mounting base.

4. A weatherstrip as claimed in claim 2, wherein said hollow sealing portions are separated by a central portion of the mounting base.

5. A weatherstrip as claimed in claim 1, wherein said hollow seal portions are separate from each other.

6. A weatherstrip as claimed in claims, wherein said hollow seal portions are separate from each other.

* * * * *